(12) United States Patent
Nakajima

(10) Patent No.: US 6,317,441 B1
(45) Date of Patent: Nov. 13, 2001

(54) METHOD AND APPARATUS FOR SYNCHRONIZING SLOT RECEIVING DATA

(75) Inventor: Akira Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/768,132

(22) Filed: Dec. 17, 1996

(30) Foreign Application Priority Data

Dec. 28, 1995 (JP) .................................................... 7-342572

(51) Int. Cl.[7] .................................. H04J 3/06; H04L 7/00
(52) U.S. Cl. ......................... 370/509; 370/350; 370/514; 375/365
(58) Field of Search .................................. 375/368, 116, 375/106, 354, 365; 370/105, 102, 512, 365, 350, 514, 509, 511, 516, 517

(56) References Cited

U.S. PATENT DOCUMENTS

| 3,641,274 | 2/1972 | Sasaki et al. | |
| 4,347,606 | * 8/1982 | Hoogeveen | 370/105 |
| 4,598,413 | 7/1986 | Szechenyi | |
| 4,920,546 | * 4/1990 | Iguchi et al. | 375/354 |
| 5,673,296 | * 9/1997 | Ohgane | 375/368 |

FOREIGN PATENT DOCUMENTS

| 05344115 | 12/1993 | (JP) . |
| 5-344115 | 12/1993 | (JP) . |
| 06315025 | 11/1994 | (JP) . |
| 6-315025 | 11/1994 | (JP) . |
| 7-193561 | 7/1995 | (JP) . |

* cited by examiner

Primary Examiner—Michael Horabik
Assistant Examiner—Kevin C. Harper
(74) Attorney, Agent, or Firm—McGinn & Gibb, PLLC

(57) ABSTRACT

A slot receiving synchronous circuit includes a temporary storage register for temporarily storing receiving slot data having an m-bit fixed length, where m is an integer, a detector for detecting whether the m-bit receiving slot data stored in the temporary storage register has a predetermined pattern, a slot counter circuit, initialized by the detection signal outputted by the detector, for synchronizing the receiving slot data, and a bit counter circuit for counting bit clocks inputted thereto in synchronization with each bit input of the receiving slot data, to provide a count value, and for supplying signals, when the count value reaches a predetermined value, to the slot counter circuit such that the slot counter circuit counts the signals. The slot counter circuit and the bit counter circuit are set to their initial values, respectively, by the detection signal.

17 Claims, 4 Drawing Sheets

METHOD AND APPARATUS FOR SYNCHRONIZING SLOT RECEIVING DATA

BACKGROUND OF THE INVENTION

The present invention generally relates to a slot receiving synchronous circuit, and more particularly to a slot receiving synchronous circuit for a digital mobile communication system provided in a communication apparatus such as a digital cellular phone, a digital cordless phone, or a satellite communication system employing time-division-multiple-access (TDMA) as its communication scheme.

DESCRIPTION OF THE RELATED ART

Digital mobile communications perform communication by defining a time frame which becomes the basic cycle for transmission and receiving of signals, and then by transmitting or receiving digital data signals using predetermined time intervals (e.g., "time slots") assigned in the time frame.

Accordingly, because multiple channels can be multiplexed in the same carrier with this time slot, it is necessary to adjust the timing between systems performing communication, so that transmission signals being transmitted through individual channels do not overlap one another, and thereby do not interfere with each other.

Thus, to adjust the timing of each communication system performing transmission and receiving, the communication systems have a common time reference. A slot counter synchronizes the timing between systems.

Specifically, when the slot counter detects a signal with a specific bit pattern (e.g., a unique word or synchronous word), a count value is set as an initial value for synchronization. The count value contains time information of how long a time slot should take from the time the unique word is detected, so that synchronization with the other system is matched.

FIG. 3 shows a block diagram of a conventional slot synchronous circuit which includes an input control circuit 31 for receiving and controlling input data, and an m-bit receiving data shift register 32 having a length equal to the data length of a communication slot where m is preferably an integer greater than 2. Typically, there are 240 bits, with the bit cycle of the bit counter being 240 bits. The receiving data shift register 32 receives the input data (referred hereafter as "received" or "receiving" data) from the input control circuit 31.

A k-bit unique word detector circuit 33, independently input with the data output from the input control circuit 31, detects a specific bit pattern (e.g., a unique word or synchronous word) from the data input thereto. A slot counter circuit 34 establishes slot synchronization with an output detection signal of the unique word detector circuit 33. A timing control circuit 35 times an entire reception operation, and a bit counter circuit 36 establishes bit synchronization under the control of the timing control circuit 35 and provides an input to the slot counter circuit 34 at the end of each bit cycle. Also shown are a central processing unit (CPU) 37 for controlling the above-mentioned elements of the circuit through the timing control circuit 35.

Hereinbelow, the operation of the conventional slot receiving synchronous circuit is described.

First, the received data is serially input into the receiving data shift register 32 through the input control circuit 31. Simultaneously, the received data is serially input into the unique word detector circuit 33 and the receiving data shift register 32. The received data is compared with a known unique word pattern of k bits (wherein k is less than m) stored in a register (illustrated in FIG. 4 and discussed below) within the unique word detector circuit 33.

The unique word detector circuit 33 has a circuit configuration as shown in FIG. 4. The receiving data is serially input into a D-input terminal of a D-type flip-flop $41_1$ in the initial stage of a k-stage cascade-connected, D-type flip-flop $41_1$–$41_k$ (where k is less than m). Bit values of receiving data are sequentially shifted to the D-type flip-flop in the next stage every time a clock is input.

Outputs of the D-type flip-flop $41_1$–$41_k$ are also input into respective adders $42_1$–$42_k$, and the outputs are exclusively logically summed with each bit value of a known k-bit unique word pattern. For example, the unique word pattern is typically the same, for example, for all portable phones. The pattern is predetermined at the transmitter end and is output thereat. The adders $42_1$–$42_k$ provide a value of logical "0" (e.g., low level) when both input values match, and provide a value of logical "1" (e.g., high level) when they do not match.

Each addition result output from the adders $42_1$–$42_k$ is supplied to a logic circuit 44. As discussed above, a logical "0" value (hereinafter also called a "matched signal") is output only when the individual output values of the D-type flip-flop $41_1$–$41_k$ match the k-bit unique word pattern from the unique word pattern register 43 for all bits. A logical "1" is output when at least one bit of the k-bit outputs of the D-type flip-flops $41_1$–$41_k$ does not match the k-bit unique word pattern stored in the unique word pattern register 43.

Referring to FIG. 3 again, the slot counter circuit 34 is reset when the unique word detection signal is input. The slot counter circuit 34 establishes a "weak" synchronization as an initial value for synchronization. For purposes of this application, a "weak" synchronization is defined as using the output of the bit counter circuit as a "rough" value or "rough" approximation of synchronization. Thus, based on the bit counter circuit, the slot counter circuit 34 establishes a rough or general synchronization, not a precise synchronization.

Generally, there are two ways to achieve synchronization. First, the slot counter circuit is used to synchronize with the input of the reset signal. Secondly, the bit counter circuit is used to count clocks which roughly synchronize the system. However, when only the slot counter is reset (e.g., only the first method is performed) the bit counter circuit is still not synchronized with the transmission bit clock.

The slot counter circuit 34 informs the timing control circuit 35 of the establishment of the weak synchronization, and the bit counter circuit 36 is reset with the output of the timing control circuit 35.

Since the bit counter circuit 36 counts up the bit clock with a rough m-bit value containing an error of several bits, receiving data in synchronization is possible only after a correction bit is defined by repeating the receiving operation several times, and by several normal receiving operations with the timing control circuit 35. Thus, the "rough" m-bit error occurs, as described above, in conventional systems. Hence, the operation must be repeated unnecessarily several times, and thus several cycles lost.

Thus, the above-mentioned conventional slot receiving synchronous circuit has several drawbacks. Specifically, the conventional slot receiving synchronous circuit is required first to synchronize the slot because it detects the unique word by the unique word detector circuit 33 independently from the receiving data shift register 32.

Here, although the receiving data latched at the detection timing of a unique word is temporarily stored in the receiving data shift register 32, since the positional relationship is not synchronized between the unique word detection position and the receiving data in the shift register 32, the receiving data "drifts" from a normal position, and is in a different position than where it should be. As a result, correcting the bit position for normalization becomes necessary, or discarding the receiving data at the time of unique word detection is required, so as to get the receiving data from the top (e.g., beginning or head) of the slot again.

Additionally, since to receive data correctly, the receiving data is again input into the receiving data shift register 32 from the beginning of the slot indicated by the slot timing, a time of at least one slot until the completion of receiving the data is required. Thus, an inefficient and time-consuming operation results.

Furthermore, since control by the timing control circuit 35 is required to define the correction bit for the bit counter circuit 36 through several normal receiving operations, the number of circuit elements is increased, leading to a complex control operation and structure.

Moreover, the conventional system requires D-type flip-flops in the unique word detector circuit 33, which further makes the system unduly large.

SUMMARY OF THE INVENTION

In view of the foregoing problems of the conventional systems, it is an object of the present invention to provide a slot receiving synchronous circuit and method which does not require a bit position correction for normalization and receiving data again.

Another object of the present invention is to provide a slot receiving synchronous circuit and method which can attain both bit synchronization and slot synchronization by easily detecting a unique word at high-speed.

Still another object of the present invention is to provide a slot receiving synchronous circuit and method which can attain both bit synchronization and slot synchronization with a simple control operation and structure, and which can simultaneously receive data input thereto.

To attain the above objects, in a first aspect, a slot receiving synchronous circuit according to the present invention includes a temporary storage register for temporarily storing receiving slot data having an m-bit fixed length, where m is an integer, a detector for detecting whether the m-bit receiving slot data stored in the temporary storage register has a predetermined pattern, a slot counter circuit, initialized by the detection signal outputted by the detector, for synchronizing the receiving slot data, and a bit counter circuit for counting bit clocks inputted thereto in synchronization with each bit input of the receiving slot data, to provide a count value, and for supplying signals, when the count value reaches a predetermined value, to the slot counter circuit such that the slot counter circuit counts the signals. The slot counter circuit and the bit counter circuit are set to their initial values, respectively, by the detection signal.

In a second aspect of the invention, a method of synchronizing slot receiving data, is provided which includes steps of: temporarily storing, in a temporary storage register, receiving slot data having an m-bit fixed length, where m is an integer; detecting whether the m-bit receiving slot data stored in the temporary storage register has a predetermined pattern; synchronizing the receiving slot data with a slot counter circuit, the slot counter circuit being initialized by a detection signal outputted in the detecting step; counting bit clocks, by a bit counter circuit, inputted in synchronization with each bit input of the receiving slot data, to provide a count value; supplying signals, when the count value reaches a predetermined value, to the slot counter circuit such that the slot counter circuit counts the signals; and setting the slot counter circuit and the bit counter circuit to their initial values, respectively, with the detection signal.

According to the present invention, since the slot counter circuit and the bit counter circuit are set to their initial values, respectively, by a unique word detection signal which is obtained when a unique word is detected at a predetermined position in m-bit receiving slot data, synchronization of bits to slots is performed at the moment (e.g., in real-time) when correct m-bit receiving slot data is stored in the temporary storage register without performing processing such as a bit position correction or obtaining receiving slot data again.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
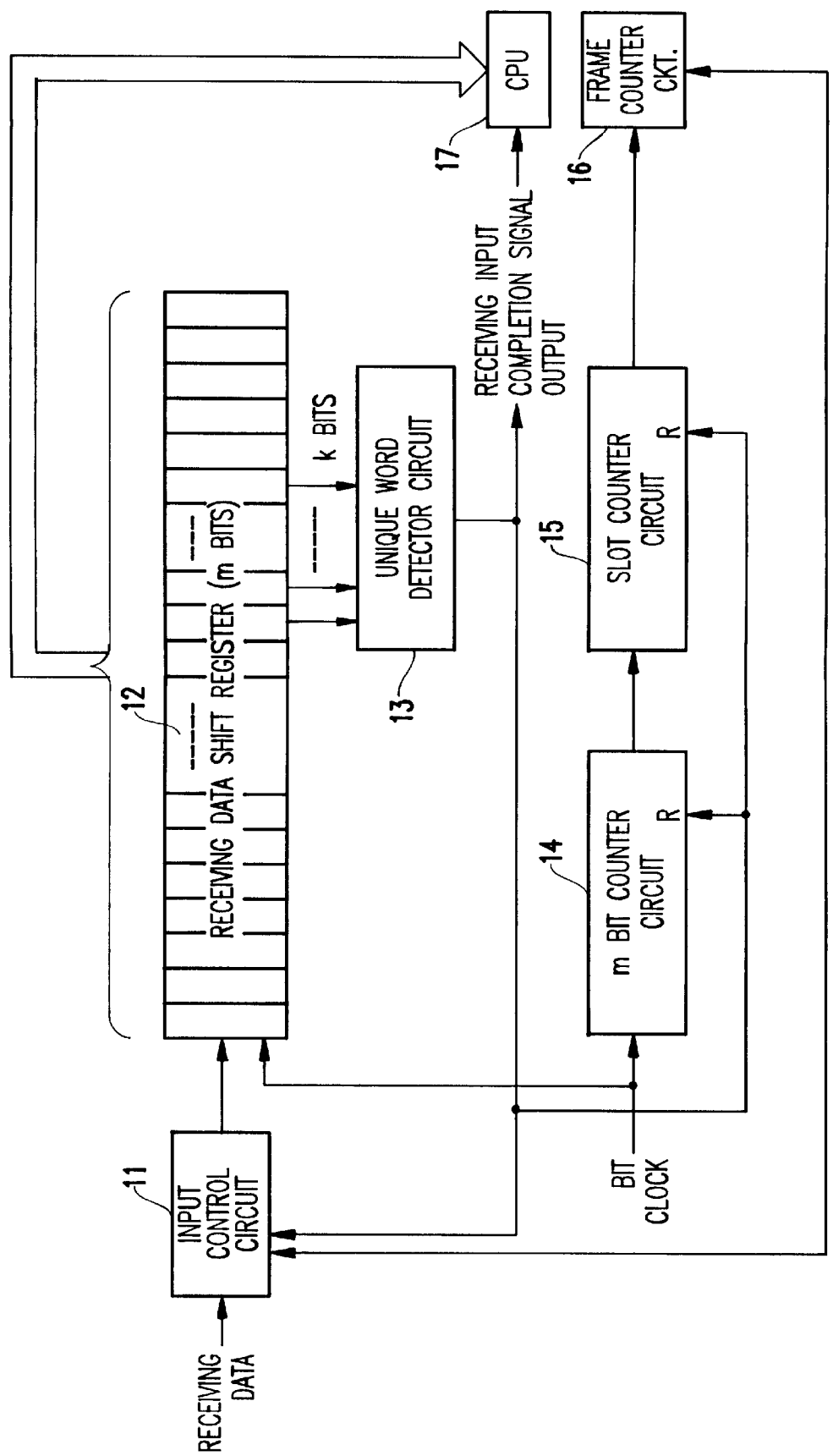
FIG. 1 is a block diagram of a first embodiment of a slot receiving synchronous circuit according to the present invention.

Referring now to the drawings, and more particularly to FIG. 1, there is shown a block diagram of a first embodiment of a slot receiving synchronous circuit according to the present invention.

The slot receiving synchronous circuit of FIG. 1 includes an input control circuit 11 for controlling the input of receiving data (e.g., data received and input therethrough), an m-bit receiving data shift register 12 in a length equal to the bit length of slot data to be communicated (where m is preferably an integer greater than 2), a unique word detector circuit 13 receiving as an input signal k-bit receiving data from which bit positions equal to a unique word assigned to predetermined k-bits on a communication slot are output in parallel on a real-time basis (where k is preferably an integer less than m), and generating a "matched" (e.g., "matching") signal when a specific synchronous signal contained in a slot data signal (e.g., unique word) is detected, and a bit counter circuit 14 and a slot counter circuit 15 both of which are reset by an output matched signal of the unique word detector circuit 13. The slot counter circuit 15 may be a 3-bit counter, but of course may have another construction. Also shown are a frame counter circuit 16 described briefly below and a CPU 17 for receiving a receiving input completion signal and for processing the received data.

As discussed in further detail below, by having the unique word detector 13 directly connected to the shift register 12 (rather than having the unique word detector 33 connected to the input control circuit 31 as in the conventional circuit), drift is overcome by the input from the register. For purposes of this invention, "real-time" means without any visible or measurable delay between the input and the output.

Circuits 11, 12, 14, and 15 have a construction similar to that of circuits 31, 32, 34, and 35 of the conventional system.

However, a key difference between the invention and the conventional system is that the invention does not require the D-type flip-flops in the unique word detector circuit 13, as in the conventional system. Specifically, in the conventional system, the D-type flip-flops were required in the unique word detector circuit 33 shown in FIG. 4.

Figure 4:
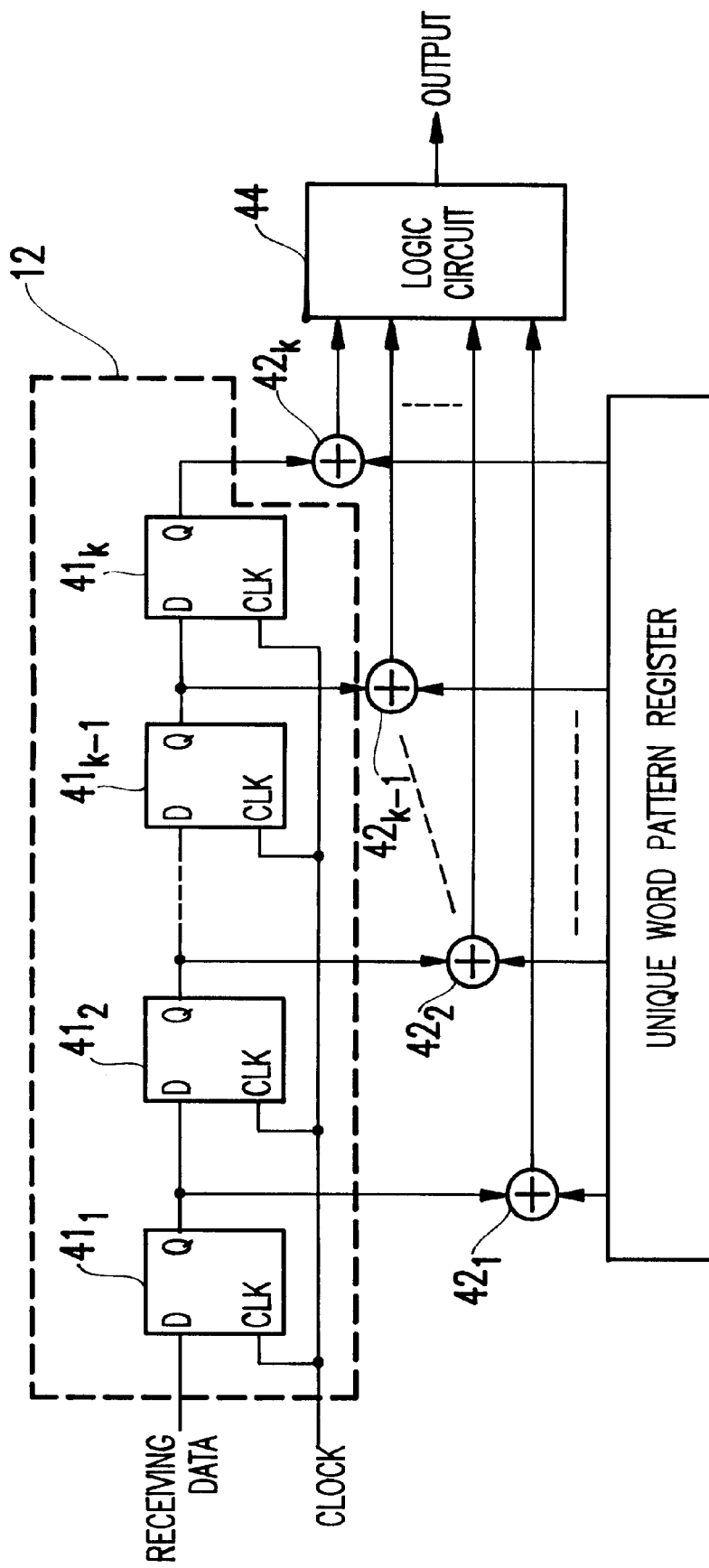
FIG. 4 is a circuit diagram for an example of a unique word detector circuit.

However, in the present invention, the unique word detector 13 utilizes the D-type flip-flop registers of the receiving data shift register 12, as shown in FIG. 4, thereby saving space and resulting in a more compact structure. Thus, the unique word detector circuit 13 does not require dedicated D-type flip-flops therein as in the conventional arrangement.

Thus, the unique word detector circuit 13 has a circuit configuration similar to that shown in FIG. 4, but instead of requiring dedicated D-type flip-flops within the circuit 13, circuit 13 uses the flip-flops of the shift register 12 as shown by the dotted line 12 in FIG. 4. In the arrangement of the inventive circuit 13, the logic gates 42 preferably comprise EX-NOR (or EX-OR) logic gates and the logic circuit 44 preferably comprises AND (or NOR) gates.

Figure 2:
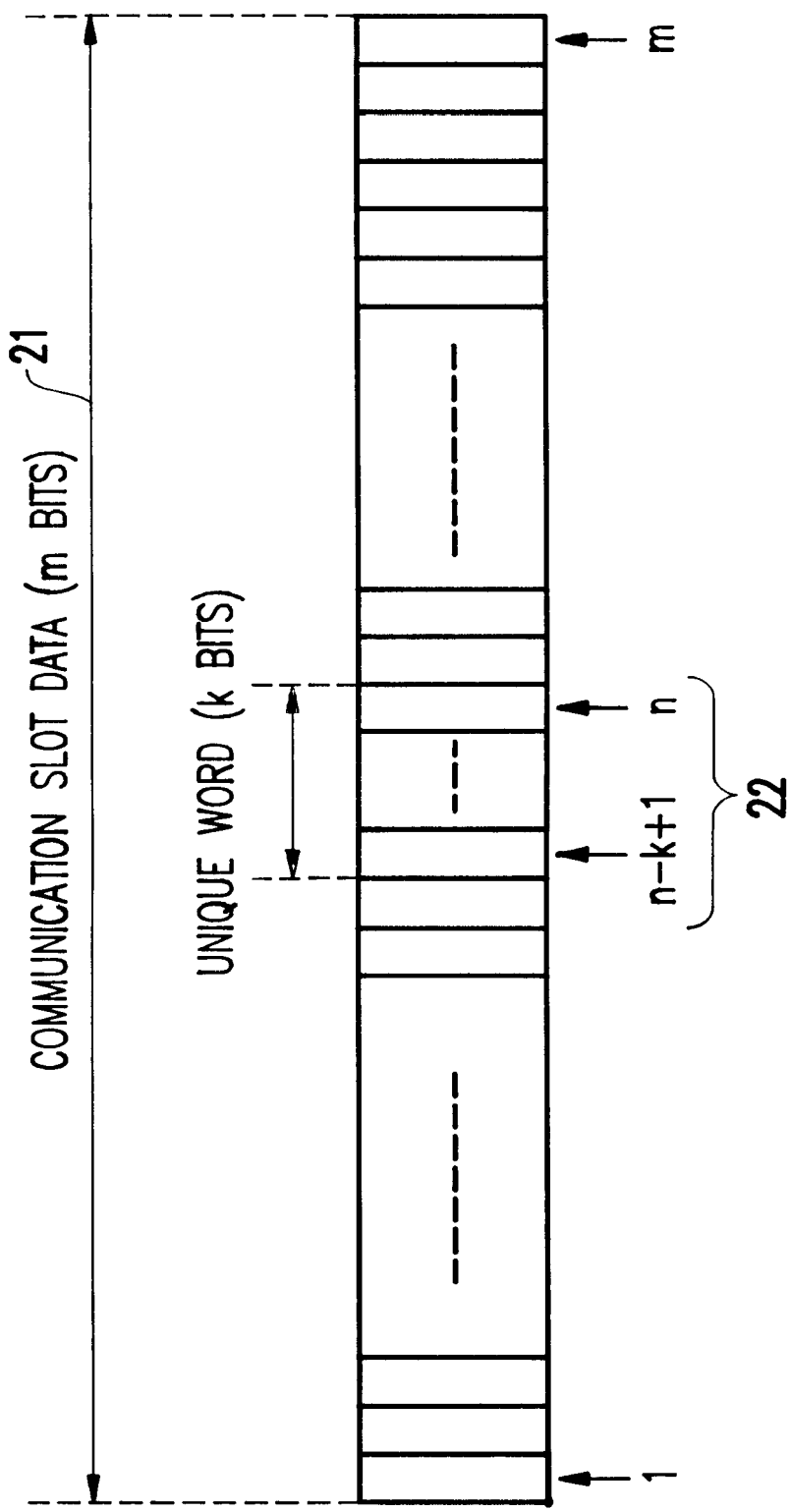
FIG. 2 is an example of a bit configuration for a communication slot received by the circuit of FIG. 1.
Figure 3:
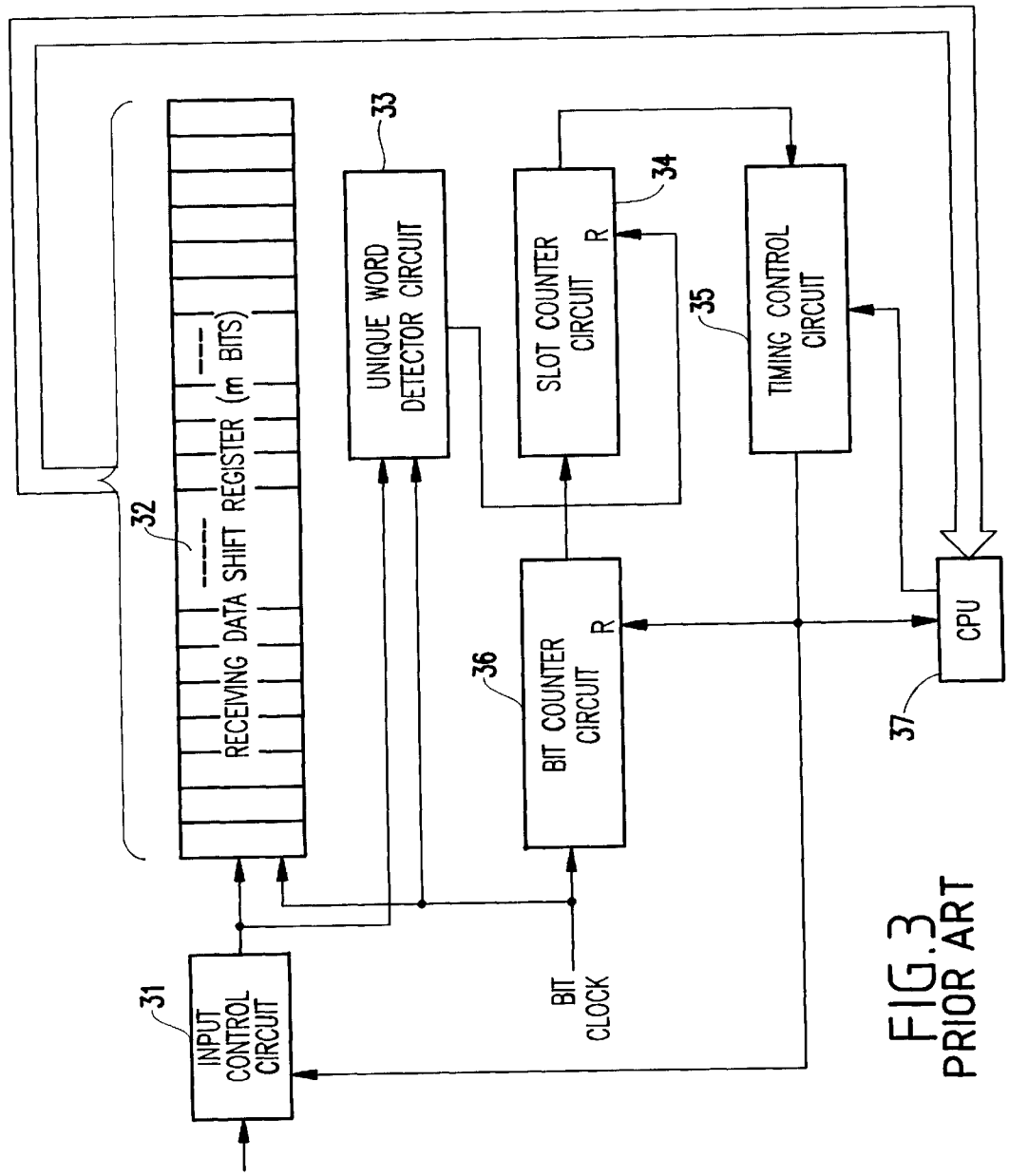
FIG. 3 is a block diagram of an example of a conventional slot receiving synchronous circuit.

FIG. 2 shows an example of the configuration of the receiving data supplied to the receiving data shift register 12 of FIG. 1.

The receiving data (e.g., the slot data 21 to be communicated) includes m-bits, and a k-bit unique word 22 is assigned at k-bit positions from (n−k+1) bit to n-bits of this slot data 21 (where n is preferably less than m), and multiplexed.

Hereinbelow, the operation of the embodiment in FIG. 1 is described. The slot data to be communicated is serially supplied to the receiving data shift register 12 through the input control circuit 11, and sequentially shifted to the right based on a shift clock (not shown). The operation of the shift clock is known to one of ordinary skill in the art and, for brevity, will not be discussed herein.

At the moment the output is performed from k-bit parallel output terminals from the (n−k+1) bit to the n-bit among m-bit parallel output terminals of the receiving data shift register 12, k-bit data from the (n−k+1) bit to the n-bit of m bits stored in the receiving data shift register 12, is supplied to the unique word detector circuit 13 in real-time. The data shift register 12 begins this parallel output continually based on the Q output of the D-type flip-flops.

As mentioned above, the unique word detector circuit 13 has a circuit configuration similar to that shown in FIG. 4, with the exception of requiring dedicated (additional) D-type flip-flop registers. In this case, D-type flip-flops $41_1$–$41_k$ in FIG. 4 form the circuit section for the (n−k+1) bit to the n-bit of the receiving data register 12. With such an arrangement, the unique word detector circuit 13 continually compares a previously known k-bit unique word pattern with the above-mentioned k-bits input from the receiving data shift register 12. The known k-bit unique word patterns are preferably stored within the circuit 13.

Since k-bit data from the (n−k+1) bit to the n-bit becomes the unique word at the moment (e.g., in real-time) when m-bit data shown in FIG. 2 is stored in the receiving data shift register 12, the unique word detector circuit 13 detects the unique word at this moment and generates a "matched" (matching) signal. For example, the matching signal may indicate a "0" to represent the matching.

The bit counter circuit 14 counts bit clocks which are in synchronization with input bits of the receiving data. Thus, the bit counter circuit 14 counts the clocks, the clocks corresponding to the input of the serial data from a QPSK modem or the like. When its count value reaches a predetermined value (m-bit count value), the bit counter circuit 14 supplies an output signal to the slot counter circuit 15 causing the slot counter circuit 15 to count. The slot counter circuit 15 counts the inputs thereto.

Specifically, the slot counter circuit 15 counts the output of the bit counter circuit 14 (e.g., the overflow) such that after each overflow the slot counter circuit 15 counts each slot. Thus, after each 240 bits of each slot, the slot counter circuit 15 is incremented. Hence, the slot counter circuit 15 outputs a count value indicative of the slot of a receiving slot to an upper level counter such as a frame counter circuit 16 or the like, for counting frames (e.g., 5 ms/frame).

Here, when the unique word detector circuit 13 detects the unique word, and outputs a matching signal, the matching signal is applied to a reset input terminal of the bit counter circuit 14 which counts the bit clock for slot synchronization, and is also input to a reset input terminal of the slot counter circuit 15 which counts the slot, respectively. The matching signal functions to simultaneously reset the bit counter circuit 14 and the slot counter circuit 15 (e.g., sets them to their initial value).

Therefore, since both the bit counter circuit 14 and the slot counter circuit 15 are simultaneously reset at the time when the unique word is detected by the unique word detector circuit 13, slot synchronization can be attained by presetting and counting as the initial value for synchronization the count values indicating time information which the time slot should have ("0" respectively in this case).

At the same time, the matching signal output from the unique word detector circuit 13 is supplied to the input control circuit 11. Then, the input control circuit 11 locks data to be input into the receiving data shift register 12, thereby the receiving data shift register 12 stores and holds data when the unique word is detected by the unique word detector circuit 13.

Therefore, the data stored in the receiving data shift register 12 at the moment is the receiving data for a correctly input communication slot. Accordingly, the matching signal can be output by the unique word detector circuit 13 to the central processing unit (CPU) 17 or the like, as a receiving input completion signal which indicates that the received data can be processed for reception. Thus, the embodiment correctly performs synchronous receiving with a simple circuit configuration, without correction for bit position or having to obtain the receiving data again.

As described above, according to the present invention, both bit synchronization and slot synchronization can be attained at the time when correct m-bit receiving slot data is stored in the temporary storage means by setting the slot counter circuit 14 and the bit counter circuit 15 to their initial values, respectively, with a unique word detection signal. The unique word detection signal is obtained when a unique word assigned to a predetermined position in the m-bit receiving slot data matches a unique word detection pattern.

As a result, synchronous receiving data input can be correctly performed with a simple circuit configuration, without correcting the bit position or having to obtain receiving slot data again. Thus, the data receiving operation can be quickly completed, as compared to the conventional system described above.

Additionally, according to the present invention, the unique word detection signal may be used as the receiving input completion signal.

Further, the circuit of the present invention requires less space and fewer components, as compared to the conventional arrangement, since the shift registers are no longer in the unique word detector circuit.

While the invention has been described in terms of a single preferred embodiment, those skilled in the art will recognize that the invention can be practiced with modification within the spirit and scope of the appended claims.

For example, the present invention can be used advantageously with time-division duplexing (TDD), as well as time-division multiple access (TDMA).

Having thus described my invention, what I claim as new and desire to secure by Letters Patent is as follows:

1. A slot receiving synchronous circuit, comprising:
    a temporary storage register for temporarily storing receiving slot data having an m-bit fixed length, where m is an integer;
    a detector for detecting whether the m-bit receiving slot data stored in said temporary storage register has a predetermined pattern;
    a slot counter circuit, initialized by a detection signal outputted by said detector, for synchronizing said receiving slot data; and
    a bit counter circuit for counting bit clocks inputted thereto in synchronization with each bit input of said receiving slot data, to provide a count value, and for supplying signals, when said count value reaches a predetermined value, to said slot counter circuit such that said slot counter circuit counts the signals,
    said slot counter circuit and said bit counter circuit being set to their initial values, respectively, by said detection signal.

2. A slot receiving synchronous circuit as claimed in claim 1, further comprising:
    an input control circuit, based on said detection signal, for controlling input of said receiving slot data to said temporary storage register.

3. A slot receiving synchronous circuit as claimed in claim 1, wherein the receiving slot data stored in said temporary storage register is held at a value at a time when said detection signal is input.

4. A slot receiving synchronous circuit as claimed in claim 1, wherein said temporary storage register comprises an m-bit shift register for serially receiving said receiving slot data having said m-bit fixed length, and for sequentially shifting said data in a predetermined direction.

5. A slot receiving synchronous circuit as claimed in claim 4, wherein said receiving slot data includes a k-bit unique word with a predetermined pattern which is assigned in a predetermined bit range and multiplexed (where m>k and k is an integer).

6. A slot receiving synchronous circuit as claimed in claim 5, wherein said detector receives as an input signal k-bit stored data output in real-time from k-bit parallel output terminals in said predetermined bit range in which said unique word is for being multiplexed among m-bit parallel output terminals of said m-bit shift register, and
    wherein said detector includes a comparator for comparing said input signal with the predetermined pattern of said unique word to detect whether said input signal comprises said unique word.

7. A slot receiving synchronous circuit as claimed in claim 1, wherein said slot counter circuit and said bit counter circuit each include reset terminals, said slot receiving synchronous circuit further comprising:
    means for setting said slot counter circuit and said bit counter circuit to their initial values, respectively, with said unique word detection signal,
    said setting means comprising means for inputting the unique word detection signal output from said detector into respective ones of said reset terminals of said slot counter circuit and said bit counter circuit.

8. A slot receiving synchronous circuit as claimed in claim 7, wherein said temporary storage register comprises an m-bit shift register for serially receiving a receiving slot data having a m-bit fixed length, and for sequentially shifting said data in a predetermined direction.

9. A slot receiving synchronous circuit as claimed in claim 8, wherein said receiving slot data includes a k-bit unique word with a predetermined pattern which is assigned in a predetermined bit range and multiplexed (where m>k, and where k is an integer).

10. A slot receiving synchronous circuit as claimed in claim 9, wherein said detector includes:
    means for receiving as an input signal k-bit stored data output in real-time from k-bit parallel output terminals in said predetermined bit range in which said unique word is for being multiplexed among m-bit parallel output terminals of said m-bit shift register; and
    a comparator for comparing said input signal with the pattern of said unique word to detect whether said input signal comprises said unique word.

11. A slot receiving synchronous circuit claimed in claim 1, wherein the unique word detection signal output from said detector comprises a signal for setting initial values for said slot counter circuit and said bit counter circuit, and a receiving input completion signal indicative of completion of receiving input of receiving data.

12. A slot receiving synchronous circuit as in claim 1, further comprising a setting device for setting said slot counter circuit and said bit counter circuit to their initial values, respectively, with said unique word detection signal,
    wherein said setting device simultaneously sets said slot counter and said bit counter circuit to said initial values.

13. A method of synchronizing slot receiving data, comprising steps of:
    temporarily storing receiving slot data;
    detecting whether the stored receiving slot data has a predetermined pattern;
    synchronizing said receiving slot data with a first counter, said first counter being initialized by a detection signal outputted based on said detecting step;
    counting clocks, by a second counter, inputted in synchronization with each bit input of said receiving slot data, to provide a count value;

supplying a signal, when said count value reaches a predetermined value, to said first counter such that said first counter counts the signal; and initializing said first counter and said second counter with said detection signal.

14. A method according to claim 13, further comprising a step of:

controlling input of said receiving slot data when said detection signal is output, such that the stored slot receiving data is held at a value at a time when said detection signal is output.

15. A method according to claim 13, wherein said step of initializing comprises initializing simultaneously said first counter and said second counter.

16. A slot receiving synchronous circuit, comprising:

a shift register for receiving data;

a detector, connected to said shift register, for detecting a unique word in said data;

a first counter connected to said detector;

a second counter connected to said detector; and an input control circuit connected to said shift register and said detector, wherein said detector simultaneously resets said first counter and said second counter when said unique word is detected, wherein, when said detector detects said unique word, said input control circuit causes said shift register to store said data, wherein said detector is connected to a first location of said shift register, and wherein said first location comprises a location where said unique word is stored in said shift register.

17. A slot receiving synchronous circuit as in claim 16, wherein data from said first location is transmitted to said detector in parallel.

* * * * *